United States Patent
Panicacci et al.

(10) Patent No.: US 9,648,265 B2
(45) Date of Patent: May 9, 2017

(54) IMAGING SYSTEMS AND METHODS FOR MITIGATING PIXEL DATA QUANTIZATION ERROR

(71) Applicant: Semiconductor Components Industries, LLC, Phoenix, AZ (US)

(72) Inventors: Roger Panicacci, Los Gatos, CA (US); Jeffery Beck, Philomath, OR (US); Barry Vanhoff, Corvallis, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 209 days.

(21) Appl. No.: 14/264,984

(22) Filed: Apr. 29, 2014

(65) Prior Publication Data
US 2015/0312499 A1    Oct. 29, 2015

(51) Int. Cl.
| | |
|---|---|
| H04N 9/64 | (2006.01) |
| H04N 5/378 | (2011.01) |
| H04N 5/357 | (2011.01) |
| H04N 5/361 | (2011.01) |
| H04N 5/365 | (2011.01) |

(52) U.S. Cl.
CPC ............ *H04N 5/378* (2013.01); *H04N 5/357* (2013.01); *H04N 5/361* (2013.01); *H04N 5/3658* (2013.01)

(58) Field of Classification Search
CPC ...... H04N 5/357; H04N 5/361; H04N 5/3658; H04N 5/378
USPC ................................................ 348/247–257
See application file for complete search history.

(56) References Cited

U.S. PATENT DOCUMENTS

| | | | |
|---|---|---|---|
| 5,925,875 A | 7/1999 | Frey | |
| 7,085,016 B2 | 8/2006 | Lu et al. | |
| 8,325,387 B2 | 12/2012 | Lee et al. | |
| 8,665,350 B2 | 3/2014 | Richardson et al. | |
| 2008/0055432 A1* | 3/2008 | Koseki | H04N 5/3658 348/241 |
| 2012/0212657 A1* | 8/2012 | Mo | H04N 5/378 348/300 |
| 2013/0141455 A1 | 6/2013 | Wang | |

* cited by examiner

*Primary Examiner* — Sinh Tran
*Assistant Examiner* — Selam Gebriel
(74) *Attorney, Agent, or Firm* — Treyz Law Group, P.C.; Michael H. Lyons; Joseph F. Guihan

(57) ABSTRACT

An image sensor may have an array of pixels and readout circuitry. The array may include image pixels that generate signals in response to image light and reference pixels that generate signals in response to electrical noise. The readout circuitry may obtain first pixel values from the image pixels and may obtain second pixel values from the reference pixels. The readout circuitry may generate an extended precision pixel value based on the second pixel values that have an extended bit width relative to the each of the second pixel values. The readout circuitry may generate multiple dithered correction values by adding randomized sequences of least significant bits to the extended precision pixel value. The readout circuitry may mitigate visible quantization error and noise such as row-correlated and column-correlated noise in the final image by subtracting the dithered correction values from corresponding first pixel values.

14 Claims, 5 Drawing Sheets

IMAGING SYSTEMS AND METHODS FOR MITIGATING PIXEL DATA QUANTIZATION ERROR

BACKGROUND

This relates generally to imaging devices, and more particularly, to imaging devices with signal noise mitigation circuitry.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals (i.e., a number of pixel values) from the image pixels.

During imaging operations, image signals generated by image sensors pixels often include noise such as row correlated noise, in which noise in the image signal is well correlated across a given row of the array of image pixels. One example of row correlated noise is temporal row noise. When temporal row noise is present in the image signals, pixel values in each row of a frame of pixel values may include a noise offset relative to other rows in the array (i.e., some rows of pixel values may be brighter or darker than other rows of pixel values regardless of the scene that is being imaged). In subsequent frames of pixel values, each row may have a different noise offset, resulting in unsightly row-by-row flickering in the captured image over time.

It would therefore be desirable to be able to provide imaging devices with improved means for mitigating image noise.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
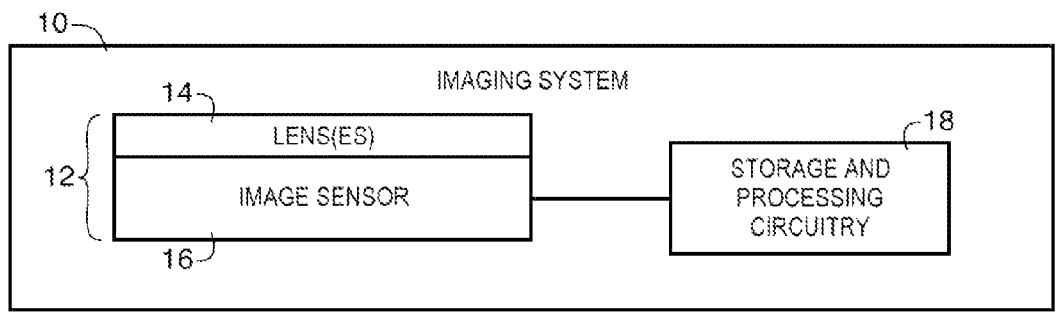
FIG. 1 is a diagram of an illustrative electronic device having an image sensor and processing circuitry for mitigating signal noise in accordance with an embodiment of the present invention.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
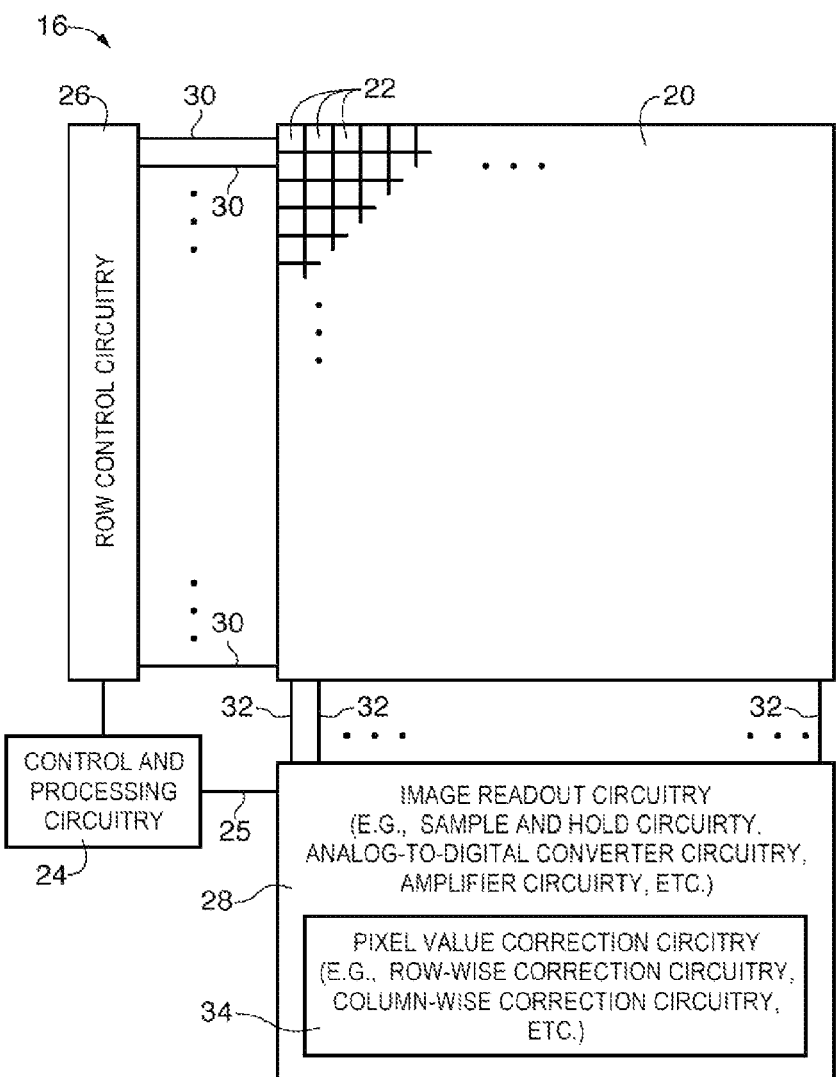
FIG. 2 is a diagram of an illustrative pixel array and associated readout circuitry for reading out image signals from image pixels in an image sensor and for generating pixel correction values to mitigate noise in the image signals in accordance with an embodiment of the present invention.

As shown in FIG. 2, image sensor 16 may include a pixel array 20 containing image sensor pixels 22 (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, transfer, and read control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

During operation of image sensor 16, image signals generated by pixels 22 may include signal noise. Noise generated within image sensor 16 may include row correlated noise (e.g., noise that is strongly correlated across an entire row of array 20) such as temporal row noise and fixed-pattern row noise, may include temporal column noise, fixed-pattern column noise, or other types of signal noise. As an example, when temporal row noise is present in the generated image signals, pixel values in each row of a given frame of pixel values may include a noise offset relative to other rows in the array (e.g., some rows of pixel values may be brighter or darker than other rows of pixel values regardless of the scene that is being imaged). In subsequent frames of pixel values, each row may have different noise offsets, resulting in an unsightly row-by-row flickering in the captured image over time.

If desired, noise in the image signals may be mitigated using digital correction methods. Image readout circuitry 28 may include noise mitigation circuitry such as pixel value correction circuitry 34 to compensate for noise in the captured image data. Pixel value correction circuitry may include, for example, row-wise correction circuitry for mitigating row correlated noise (e.g., temporal row noise, fixed pattern row noise, or any other row-by-row noise present in the image data), column-wise correction circuitry for mitigating column noise (e.g., temporal column noise, fixed pattern column noise, or any other column-by-column noise present in the image data), and/or any other desired circuitry for mitigating the effects of noise in image data captured by array 20.

If desired, array 20 may include dedicated pixels for estimating the noise component of the image signals generated by array 20 (sometimes referred to herein as correction pixels, special pixels, reference pixels, black pixels, or dark pixels). Dark pixels in array 20 may be blocked from receiving image light from a scene so that the dark pixels generate pixel values only in response to electrical noise in array 20 (e.g., pixel values generated by the dark pixels may be dominated by noise). In other words, image pixels 22 on array 20 may capture image signals (e.g., generate charge) in response to image light, whereas dark pixels 42 may capture signals without generating any charge in response to the image light.

As an example, dark pixels in array 20 may include opaque color filter elements (e.g., black color filter elements) or shielding layers that block image light from being received by the photosensor in the dark pixels, may be located on portions of array 20 that do not receive image light, or may include any other desired structures for filtering out image light so that the pixel values generated by the dark pixels are not generated in response to image light. Noise correction circuitry 34 may generate correction values that estimate the noise component of the image signals generated in array 20 (sometimes referred to herein as noise error) using pixel values read out from dark pixels in array 20. The correction values may be subtracted from the pixel data to remove the noise component from the pixel data.

Figure 3:
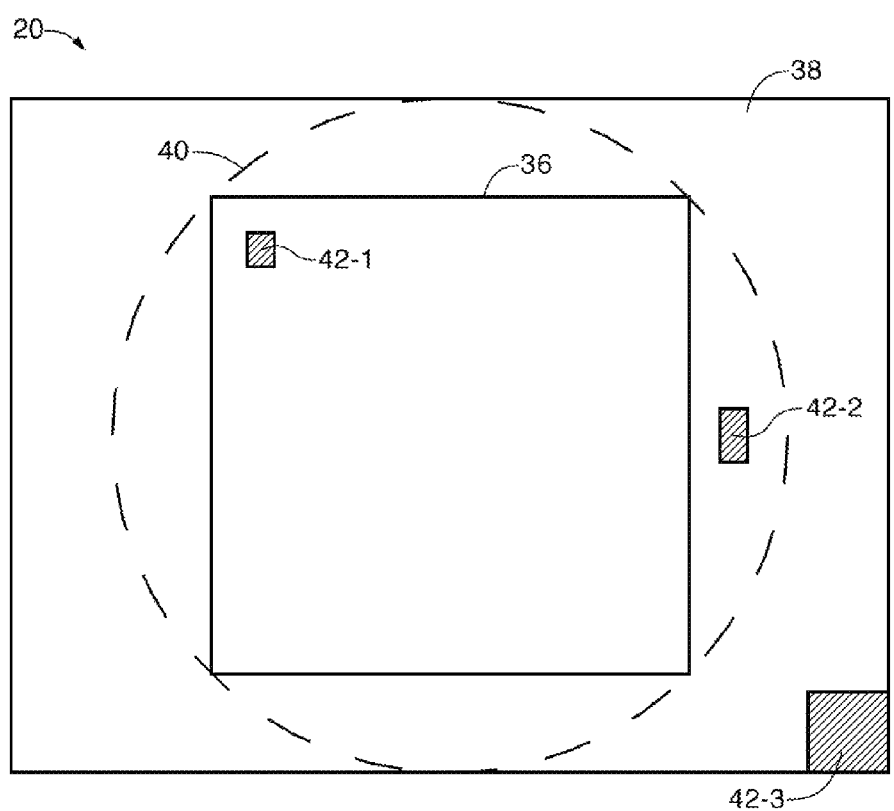
FIG. 3 is a diagram of an illustrative image sensor pixel array having dark pixels that generate dark pixel values for generating pixel correction values that mitigate noise in captured image signals in accordance with an embodiment of the invention.

FIG. 3 is an illustrative diagram showing how dark pixels may be formed within array 20 for estimating the noise component of the image signals generated by array 20. As shown in FIG. 3, pixel array 20 may include an active region 36 of image pixels 22 and an inactive region 38. Active region 36 may be formed under image circle 40 of lens 14 (e.g., a circle of coverage of lens 14 of FIG. 1 as shown by dashed circle 40). Image light transmitted by lens 14 is received by active region 36 of pixel array 20, whereas inactive region 38 of pixel array 20 does not receive image light from lens 14. Array 20 may include one or more regions of dark pixels 42 (e.g., a first region 42-1 of dark pixels 42, a second region 42-2 of dark pixels 42, a third region 42-3 of dark pixels 42, etc.). Each region of dark pixels 42 may include any desired number of dark pixels (e.g., one or more dark pixels) arranged in any desired shape (e.g., spanning one or more rows and one or more columns of array 20).

Regions of dark pixels 42 may be formed on any desired portion of array 20. In the example of FIG. 3, a first region 42-1 of dark pixels 42 is formed within active region 36 of array 20, a second region 42-2 of dark pixels 42 is formed within inactive region 38 and within image circle 40, and a third region 42-3 of dark pixels 42 is formed within inactive region 38 and outside of image circle 40. If desired, dark pixels 42 in region 42-1, 42-2, and/or region 42-3 may be provided with opaque color filter elements or metal shield layers for blocking image light. Because no image light is passed from lens 14 to the dark pixels 42 in region 42-3, dark pixels 42 in region 42-3 need not include any opaque color filter elements or metal shield layers for blocking image light. The example of FIG. 3 is merely illustrative. If desired, any desired number of dark pixels 42 may be formed on array 20 in any desired number of regions having any desired shape and size. Pixel values generated by dark pixels 42 may sometimes be referred to herein as dark pixel values, whereas pixel values generated by pixels 22 (e.g., pixels 22 that generate image signals in response to image light) may sometimes be referred to herein as image pixel values. After conversion into digital pixel data, dark pixel values may sometimes be referred to herein digital dark pixel values or collectively as digital dark pixel data and image pixel values may sometimes be referred to herein as digital image pixel values or collectively as digital image pixel data.

Image readout circuitry 28 may read out dark pixels 42 simultaneously with one or more groups of pixels 22 in array 20. For example, when array 20 is read out on a row-by-row basis, dark pixels 42 may be read out simultaneously with each row of array 20 as that row is read out. In this way, dark pixel values generated by dark pixels 42 may reflect the electrical noise (e.g., temporal row noise) component of the image pixel values generated in that row of array 20. In general, any desired number of dark pixels 42 may be read out simultaneously with any desired subset of pixels 22 in array 20 so that the dark pixel values reflect the noise present in the image pixel values generated by that subset of pixels 22.

ADC circuitry in image readout circuitry 28 may convert image pixel values generated by pixels 22 into digital image pixel data and may convert dark pixel values generated by dark pixels 42 into digital dark pixel data. In many scenarios, to compensate for noise in the digital image pixel data, an average value of the digital dark pixel values is subtracted from the digital image pixel data to remove the noise component from the digital image pixel data. The digital image pixel values and digital dark pixel values have finite (discrete) precision (e.g., because the digital pixel values and digital dark pixel values are each represented by a sequence of binary bits having finite precision). In typical arrangements, the digital dark pixel values have the same precision (sometimes referred to as bit depth) as the digital image pixel values. For example, the digital image pixel data and the digital dark pixel data may both be 4-bit binary data that represents the analog pixel values and dark pixel values as one of $2^4=16$ possible discrete values. This finite precision may result in round-off error (sometimes referred to as quantization error) upon subtraction of the average dark pixel value from the digital pixel data (e.g., because the average of the dark pixel values may be a fractional number that requires more precision than the bit depth of the data can characterize). In scenarios where random (temporal) noise of the image is low, quantization error may dominate the noise contributions to the image signal. If care is not taken, quantization error can generate unsightly, visible artifacts in the noise-corrected pixel data that degrades the quality of the final image.

As an example of quantization error, four dark pixels 42 may capture four dark pixel values that are converted to digital dark pixel values. The digital dark pixel values and the digital image pixel values may both be 4-bit binary data that can be represented by the set of integers between 0 and 15. In order to mitigate noise in the digital pixel data, the digital dark pixel values may be averaged to generate a pixel correction value. The pixel correction value may be subtracted from the digital pixel data to generate noise-corrected data. In this example, the digital dark pixel values may be 1, 1, 2, and 3 (0001, 0001, 0010, and 0011). The average (mean) of these values value is 1.75. However, only a value of 1 or 2 may be subtracted from the digital pixel data, as the digital data has insufficient precision to subtract 0.75 from the digital image pixel values. There will thereby be a quantization error of 0.25 or 0.75 in the noise-corrected pixel value, which can result in visible artifacts in the final image.

Figure 4:
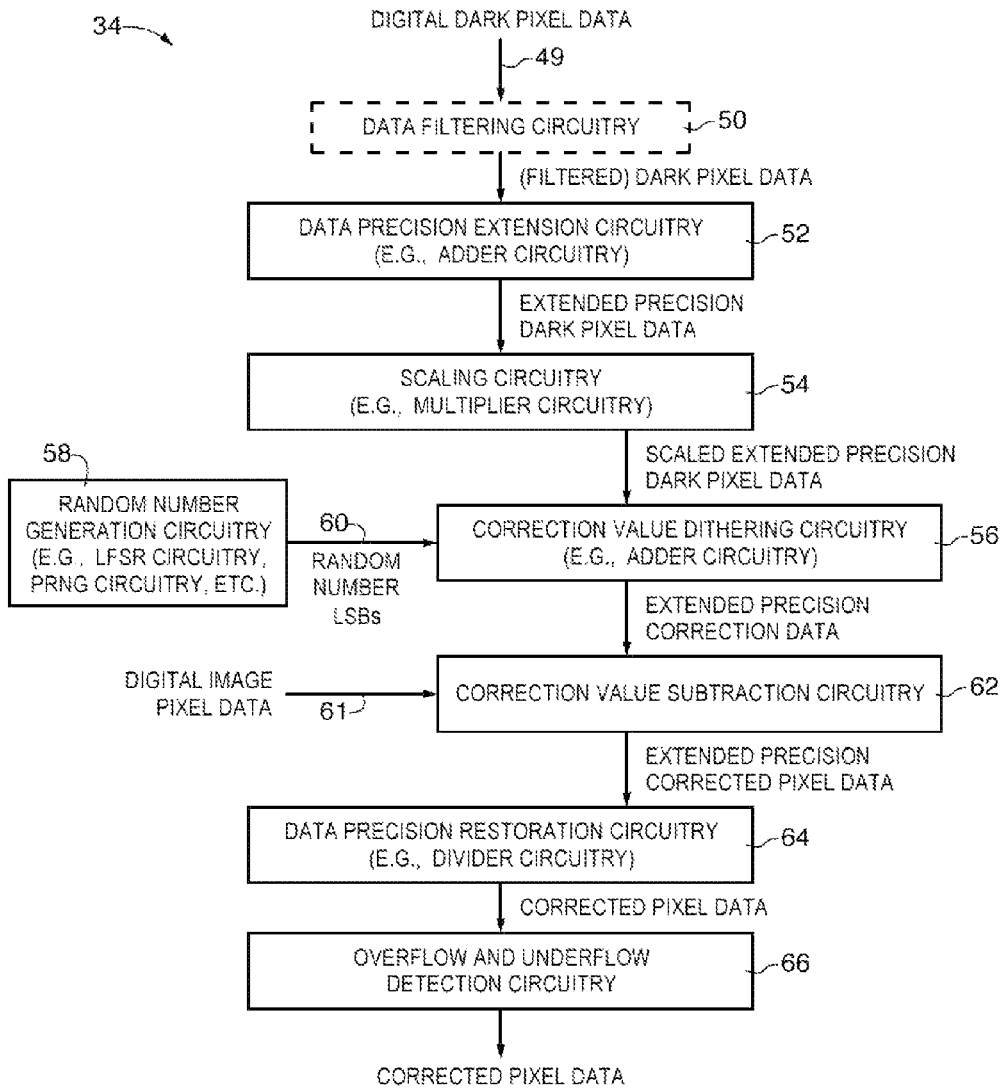
FIG. 4 is a diagram of illustrative pixel value correction circuitry for generating pixel correction values having extended precision and for correcting pixel data using the pixel correction values for mitigating noise and quantization error in the pixel data in accordance with an embodiment of the present invention.

If desired, pixel value correction circuitry 34 may extend the precision (bit depth) of pixel correction values for subtracting from the digital pixel image data and may add noise to the pixel correction values by randomizing (dithering) the pixel correction values to mitigate the effects of quantization error in the final image. FIG. 4 is an illustrative diagram of pixel value correction circuitry 34 (as shown in FIG. 2) for mitigating noise and quantization error associated with image pixel values generated by array 20. As shown in FIG. 4, pixel value correction circuitry 34 may include data precision extension circuitry 52, scaling circuitry 54, correction value dithering circuitry 56, random number generation circuitry 58, correction value subtraction circuitry 62, data precision restoration circuitry 64, overflow and underflow detection circuitry 66, and optional data filtering circuitry 50.

Pixel value correction circuitry 34 may receive digital dark pixel data over input path 49. For example, digital dark pixel data received may be received from ADC circuitry within readout circuitry 28 or from any other desired portions of readout circuitry 28. As an example, correction circuitry 34 may receive 216 digital dark pixel values (samples) of 13-bit signed data (e.g., circuitry 34 may receive a respective digital dark pixel value from 216 dark pixels 42 and each digital dark pixel value may include 13 binary bits and a corresponding sign bit).

The digital dark pixel data may be passed to optional data filtering circuitry 50. Filtering circuitry 50 may perform filtering operations on the digital dark pixel data. By filtering the digital dark pixel data, data filtering circuitry 50 may remove potential outlier dark pixel values from processing. Filtering circuitry 50 may pass the digital dark pixel data to data precision extension circuitry 52. In another suitable arrangement, digital dark pixel data may be passed to data precision extension circuitry 52 without filtering the data.

Data precision extension circuitry may sum the=dark pixel data to generate extended precision dark pixel data having a greater bit depth than the bit depth of each digital dark pixel value received over input 49. For example, precision extension circuitry 52 may include adder circuitry that adds each digital dark pixel value received over input 49 (e.g., that adds the dark pixel values received for each dark pixel 42) to generate an extended precision dark pixel value. The extended precision dark pixel value may have an extended (greater) bit depth relative to the bit depth of each digital dark pixel value. In the example where the digital dark pixel data includes 216 digital dark pixel values of 13-bit signed data, precision extension circuitry 52 may sum each digital dark pixel value to generate a 20-bit signed extended precision dark pixel value, for example. Data precision extension circuitry 52 may pass the extended precision dark pixel values to scaling circuitry 54.

Scaling circuitry 54 may scale the extended precision dark pixel values so that the extended precision dark pixel values are equal to a power of 2. For example, scaling circuitry 54 may include multiplier circuitry that multiplies the extended precision dark pixel values by a scaling factor to generate scaled extended precision dark pixel values that are equal to a power of 2. Scaling circuitry 54 may pass the scaled extended precision dark pixel values to correction value dithering circuitry 56. The example of FIG. 4 is merely illustrative and does not serve to limit the scope of the invention. Pixel value correction circuitry 34 may implement data filtering circuitry 50, data precision extension circuitry 52, and scaling circuitry 54 in any desired order. For example, pixel value correction circuitry 34 may perform scaling operations on dark pixel data using scaling circuitry 54 prior to performing precision extension operations using precision extension circuitry 52 (e.g., the output of scaling circuitry 54 may be coupled to the input of extension circuitry 52), may filter the dark pixel data using filtering circuitry 50 after performing precision extension operations using extension circuitry 52 (e.g., the output of extension circuitry 52 may be coupled to the input of filtering circuitry 50), etc.

Correction value dithering circuitry 56 may receive randomized least-significant-bits (LSBs) from random number generation circuitry 58. If desired, random number generation circuitry 58 may generate random numbers and may provide a predetermined number of least significant bits of the random numbers to correction value circuitry 56 over path 60. Random number generation circuitry 58 may include any desired random number generator circuitry for generating random numbers. For example, circuitry 58 may include pseudo random number generator circuitry that generates pseudo random numbers and may provide a predetermined number of least significant bits of the pseudo random number to correction value dithering circuitry 56. As another example, circuitry 58 may include linear feedback shift register (LFSR) circuitry (e.g., shift registers having an input bit that is a linear function of its previous state). The LFSR circuitry may generate random sequences of bits. Random number generation circuitry 58 may strip a predetermined number of least significant bits from the random sequence of bits and may provide the LSBs to correction value circuitry 56. As an example, random number generation circuitry 58 may provide the 8 least significant bits of a 24-bit random number to correction value 56. In general, circuitry 58 may provide any desired number of least significant bits to correction value dithering circuitry 56 (e.g., random number generation circuitry 58 may provide one least significant bit of a random number to circuitry 56, may provide at least one least significant bit of a random number to circuitry 56, may provide two least significant bits of a random number, three least significant bits of a random number, four least significant bits of a random number, more than four least significant bits of a random number, or any other desired number of least significant bits of a rand number to circuitry 56).

Correction value dithering circuitry 56 may add the least significant bits received from circuitry 58 to the scaled extended precision dark pixel values received from scaling circuitry 54. For example, correction value dithering circuitry 56 may include adder circuitry that adds the LSB values to the scaled extended precision dark pixel values to generate extended precision correction values having dithered least significant bits (e.g., the least significant bits of the extended precision correction values may be randomized, whereas the more significant bits may be determined based on the dark pixel data). If desired, correction value dithering circuitry 56 may add different random LSBs to a given scaled extended precision dark pixel value to generate multiple extended precision correction values (sometimes referred to herein as dithered correction values, randomized correction values, or correction values having a randomized sequence of least significant bits). For example, dithering circuitry 56 may generate a first extended precision correction value by adding a first sequence of random LSBs to a given scaled extended precision dark pixel value and may generate a second extended precision correction value by adding a second sequence of random LSBs to that scaled extended precision dark pixel value. The correction values may thereby be randomized values that are uniformly distributed around the given scaled extended precision dark pixel value. Correction value dithering circuitry 56 may pass the extended precision correction values to correction value subtraction circuitry 62.

Correction value subtracting circuitry 62 may receive digital image pixel values having the extended precision over input 61 (e.g., image pixel values received over path 61 may have the same bit depth as the extended precision correction data received from circuitry 56). Subtraction circuitry 62 may subtract the extended precision correction values from the digital image pixel values to generate extended precision corrected pixel data. Correction value subtraction circuitry 62 may, if desired, sequentially operate on digital image pixel values so that extended precision correction values having different randomized LSBs are subtracted from each digital image pixel value. For example, circuitry 56 may subtract a first extended precision correction value from a first image pixel value and may subtract a second extended precision correction value from a second image pixel value. In this way, the correction value subtracted from the digital image pixel data may be randomized (dithered) to mitigate the effects of quantization noise in the pixel data.

As an example, the digital dark pixel data may be read out by dark pixels 42 simultaneously with the image pixel data read out by a selected row of pixels 22 in array 20. Correction value dithering circuitry 56 may generate different extended precision correction values for each pixel in the selected row of pixels (e.g., by adding different randomized LSBs to a given scaled extended precision dark pixel value). The extended precision correction values may be uniformly distributed about the scaled extended precision dark pixel value. In this way, the extended precision correction values may be randomized across the row of pixels 22 while ensuring that the average of the extended precision correction values is equal to the scaled extended precision dark pixel value (e.g., the desired correction value for that row of pixels 22). The correction value subtraction circuitry may subtract a respective extended precision correction value from each digital image pixel value received over input 61. In this way, different correction values are subtracted from each image pixel value in the row. The randomized LSBs may serve to dither the correction values so that, as a population, the correction values closely approximate the desired noise error across the entire row of pixels without introducing visible quantization error artifacts upon subtraction of the correction values from the pixel data that would be present if a single average value were subtracted from the pixel data across the row.

Correction value subtraction circuitry may pass the extended precision corrected pixel data to data precision restoration circuitry 64. Data precision restoration circuitry 64 may restore the bit depth of the extended precision corrected pixel data to the original bit depth of the digital image pixel data. For example, precision restoration circuitry 64 may include divider circuitry that divides the extended precision corrected pixel data by a predetermined amount (e.g., that bit shifts the extended precision corrected pixel data to the right by a predetermined number of bits) to generate corrected pixel data.

As an example, consider the scenario described above in which the desired correction value is 1.75 for a selected row of pixels. If each image pixel value in a row of image pixel values provided to correction value subtraction circuitry 62 has a value of 8, the LSBs of the extended precision correction values may be randomized so that three out of every four of the corrected pixel values in that row are equal to 6 and so that one out of every four of the corrected pixel values in that row are equal to 7 after restoring the pixel data precision. By extending the precision of the data, circuitry 34 may dither the correction values so that row correlated noise may be mitigated across the entire row without introducing noticeable quantization error artifacts.

If desired, data precision restoration circuitry 64 may pass the corrected pixel data to overflow and underflow detection circuitry 66. Circuitry 66 may detect overflow and/or underflow in the corrected pixel data. Circuitry 66 may, for example, clip the pixel data to a minimum value if underflow is detected and/or clip the pixel data to a maximum value if overflow is detected. The corrected pixel data may then be passed to other processing circuitry (e.g., processing circuitry 18) for additional processing and storage.

Figure 5:
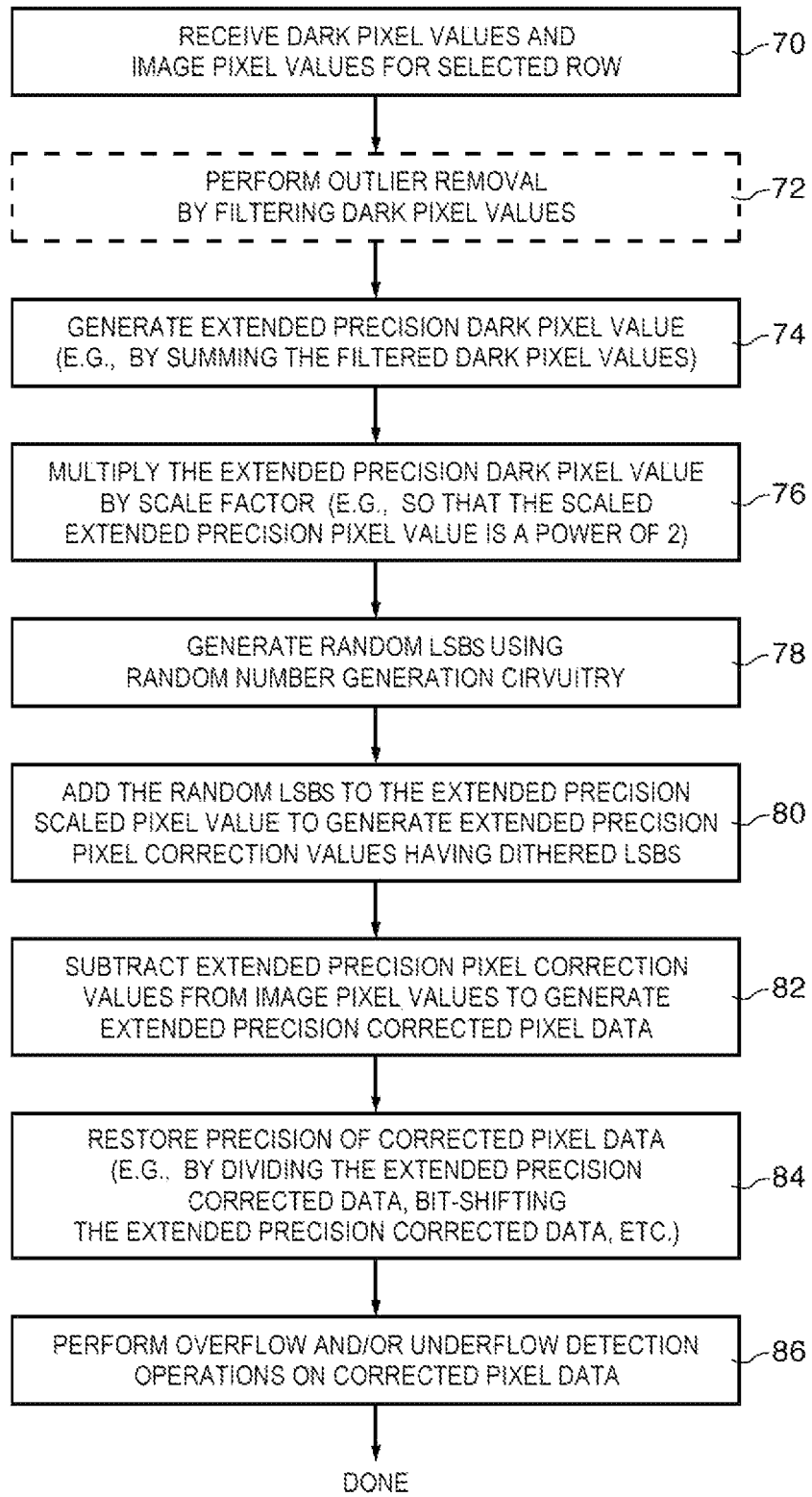
FIG. 5 is a flow chart of illustrative steps that may be performed by pixel value correction circuitry of the type shown in FIG. 4 for mitigating noise and quantization error in pixel data in accordance with an embodiment of the present invention.

A flow chart of illustrative steps that may be performed by pixel value correction circuitry 34 of FIG. 4 for mitigating noise and quantization error in image data is shown in FIG. 5. The steps of FIG. 5 may, for example, be performed by circuitry 34 to perform row-wise correction operations (e.g., for mitigating temporal or fixed pattern row noise) on a row of pixels 22 in array 20 after image pixel values for that row have been readout by readout circuitry 28 and converted to digital pixel values. Dark pixels 42 may capture dark pixel values and the dark pixel values may be read out by readout circuitry 28 simultaneously with the image pixel values readout from the row of pixels 22.

At step 70, pixel value correction circuitry 34 may receive digital image pixel values for a selected row of array 20 and corresponding digital dark pixel values. For example, correction circuitry 34 may receive the digital image pixel values and the digital dark pixel values from analog-to-digital converter circuitry in readout circuitry 28.

At optional step 72, data filtering circuitry 50 may optionally perform dark pixel value outlier removal operations by filtering the digital dark pixel values.

At step 74, data precision extension circuitry 52 may generate an extended precision dark pixel value for the selected row of array 20 using the (filtered) dark pixel values. For example, data precision extension circuitry 52 may add each of the digital dark pixel values to generate an extended precision dark pixel value having an extended bit width relative to each individual digital dark pixel value prior to performing the addition operation. The extended bit width of the summed extended precision dark pixel value may allow the least significant bits of the extended precision dark pixel value to have enhanced precision relative to the digital data received from the analog-to-digital converter circuitry so that those bits may be randomized to mitigate the visible effects of quantization error when subtracted from the image pixel data.

At step 76, scaling circuitry 54 may multiply the extended precision dark pixel value by a scaling factor to generate a scaled extended precision pixel value for the selected row of array 20. For example, scaling circuitry 54 may multiple the extended precision dark pixel value by a scaling factor so that the scaled extended precision pixel value is equal to a power of two. This example is merely illustrative. In general, the extended precision dark pixel value may be multiplied by any desired scaling factor.

At step 78, random number generation circuitry 58 may generate random numbers and may provide the least significant bits of the random numbers (e.g., a predetermined number of least significant bits of the random numbers) to correction value dithering circuitry 56. If desired, the random numbers may be uniformly distributed.

At step 80, correction value dithering circuitry 56 may add the least significant bits of the random numbers generated by random number generation circuitry 58 to the scaled extended precision dark pixel value to generate an extended precision correction value corresponding to each image pixel in the selected row. For example, dithering circuitry 56 may generate a first extended precision correction value by adding a first sequence of random number LSBs that were generated by random number generation circuitry 58 to the scaled extended precision dark pixel value and may generate a second extended precision correction value by adding a second sequence of random number LSBs that were generated by random number generation circuitry 58 to the scaled extended precision dark pixel value. Each extended precision correction value may correspond to one of the received image pixel values, so that image pixel values from each pixel 22 in the selected row may be offset by a different extended precision correction value. The extended precision correction values may have randomized LSBs that are uniformly distributed around the scaled extended precision dark pixel value (e.g., so that an average of the extended precision correction values across the row is equal to the desired correction value even if the received digital image pixel data does not have sufficient bit-depth to resolve the desired correction value).

At step 82, correction value subtraction circuitry 62 may subtract a corresponding extended precision correction value from each of the image pixel values associated with the selected row to generate corrected pixel values for that row. For example, subtraction circuitry 62 may subtract the first extended precision correction value from a first image pixel value in the selected row to generate a first corrected pixel value, may subtract the second extended precision correction value from a second image pixel value in the selected row to generate a second corrected pixel value, may subtract a third extended precision correction pixel value from a third image pixel value in the selected row to generate a third corrected pixel value, etc.

At step 84, data precision restoration circuitry 64 may restore the precision of the corrected pixel values. For example, precision restoration circuitry 64 may divide the correction values by a predetermined value, may bit shift the corrected pixel values to the right, etc. The randomized LSBs of the extended precision correction values may alter the LSB of the corrected pixel values after subtraction to mitigate visible effects of both row noise and quantization error in the corrected pixel values.

At step 86, overflow and underflow detection circuitry 66 may, if desired, perform overflow and underflow detection operations on the corrected pixel data. Overflow and underflow detection circuitry 66 may clip the corrected pixel data if overflow and/or underflow is detected in the corrected pixel data. The corrected data may subsequently be passed to other circuitry for additional processing, display, and/or storage. If desired, this process may be repeated to readout the remaining rows of array 20 while mitigating row noise and visible effects of quantization error in the final image.

The example of FIG. 5 is merely illustrative. If desired, the steps of FIG. 5 may be performed to mitigate column correlated noise (e.g., fixed pattern column noise and/or temporal column noise that is well correlated across a column of the array) while also mitigating the visible effects of quantization error (e.g., randomized correction values may be subtracted from each digital image pixel value in a given column of array 20). As another example, the steps of FIG. 5 may be performed to mitigate correlated noise and quantization error for a group of pixels 22 in array 20 such as a group of pixels spanning multiple rows and columns of array 20 (e.g., dithered correction values may be subtracted from each digital image pixel value in the group of pixels). In general, the steps of FIG. 5 may be performed for pixel values captured by any desired set of pixels 22 to mitigate noise and quantization error. The steps of FIG. 5 may be performed in any desired order (e.g., pixel value correction circuitry 34 may perform step 76 prior to step 74 to perform scaling operations prior to performing precision extension operations, may perform step 72 after step 74 to perform filtering after performing precision extension operations, may perform step 72 after step 76 to perform filtering operations after performing scaling operations, etc.).

Figure 6:
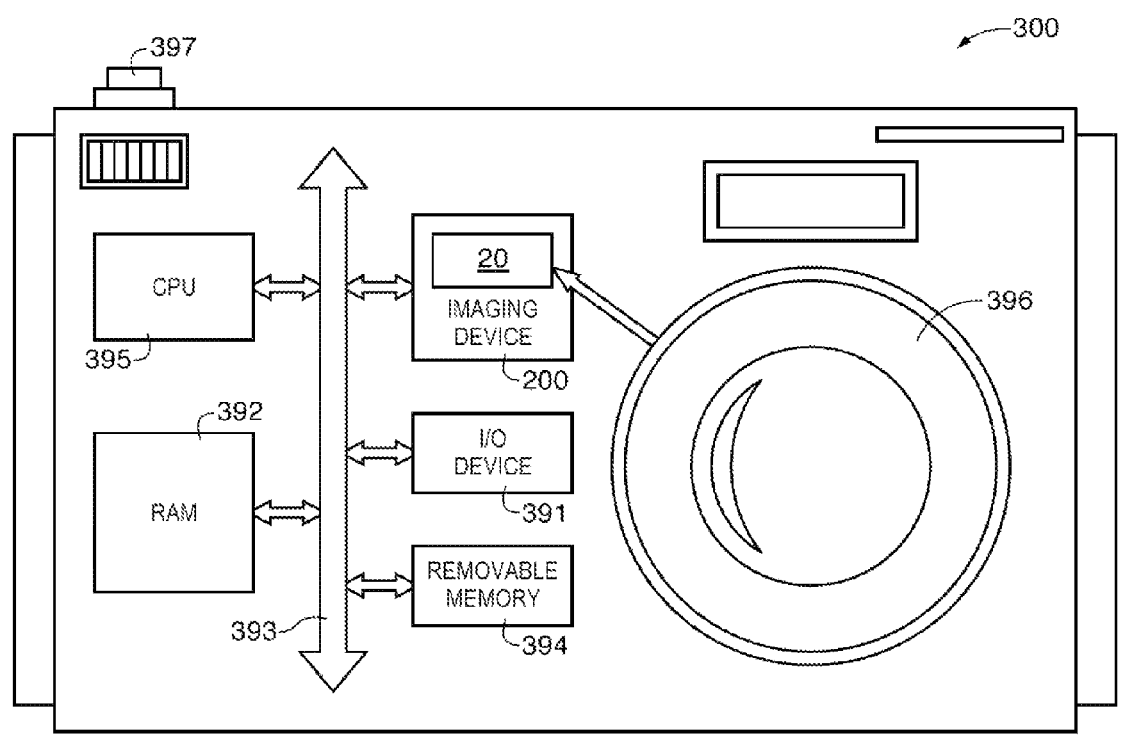
FIG. 6 is a block diagram of a processor system employing the embodiments of FIGS. 1-5 in accordance with an embodiment of the present invention.

FIG. 6 shows in simplified form a typical processor system 300, such as a digital camera, which includes an imaging device 200 (e.g., an imaging device 200 such as device 10 of FIGS. 1-5 and the techniques for dithering pixel correction values to mitigate row noise and quantization error). The processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 20 of device 200 when a shutter release button 397 is pressed, central processing unit (CPU) 395, such as a microprocessor which controls camera and one or more image flow functions, which communicates with one or more input/output (I/O) devices 391 over a bus 393. Imaging device 200 also communicates with the CPU 395 over bus 393. The system 300 also includes random access memory (RAM) 392 and can include removable memory 394, such as flash memory, which also communicates with CPU 395 over the bus 393. Imaging device 200 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating image sensors having pixel correction circuitry for generating randomized pixel correction values for mitigating noise and mitigating the effects of quantization error in images.

An image sensor may have an array of image sensor pixels arranged in rows and columns and readout circuitry for reading out image signals from the array. The array may include a group (set) of image sensor pixels that generates first image signals in response to image light and a group of reference pixels that generates second image signals in response to electrical noise (e.g., without generating charge in response to the image light). The readout circuitry may obtain a first set of digital pixel values from the group of image sensor pixels and may obtain a second set of digital pixel values from the group of reference pixels. For example, the readout circuitry may read out the first and second image signals from the array, may convert the first image signals into the first set of digital pixel values, and may convert the second image signals into the second set of digital pixel values. The readout circuitry may generate dithered (randomized) correction values based on the second set of digital pixel values and may subtract the dithered correction values from the first set of digital pixel values to mitigate the effects of noise and quantization error in the final image. If desired, the group of image sensor pixels may be located in a single row of the array and the readout circuitry may mitigate the effects of row correlated noise (e.g., temporal row noise or fixed pattern row noise) in the final image by subtracting the dithered correction values from the first set of pixel values. In another suitable arrangement, the group of image sensor pixels may be located in a single column of the array and the readout circuitry may mitigate the effects of column correlated noise in the final image by subtracting the dithered correction values from the first set of pixel values.

Each pixel value in the second set of pixel values may have a first bit width. The readout circuitry may include pixel value correction circuitry that performs precision extension operations on the second set of pixel values to generate an extended precision pixel value having a second bit width that is greater than the first bit width. The pixel value correction circuitry may multiply the extended precision pixel value by a scaling factor to generate a scaled extended precision pixel value. The pixel value correction circuitry may include random number generation circuitry that generates random numbers (e.g., pseudo random numbers). For example, the random number generation circuitry may generate random sequences of binary bits. The pixel value correction circuitry may randomize at least one bit of the scaled extended precision pixel value by adding at least one bit (e.g., at least one least significant bit) from the random sequences of bits to the scaled extended precision pixel value to generate the dithered correction values. If desired, at least one bit of different random sequences of bits may be added to the scaled extended precision pixel value to generate multiple dithered correction values.

The pixel value correction circuitry may perform subtraction operations by subtracting the dithered correction values from corresponding pixel values in the first set of pixel values to generate corrected pixel values. If desired, the readout circuitry may perform precision reduction operations on the corrected pixel values so that the corrected pixel values have the first bit width. The subtraction operation may, for example, mitigate noise in the corrected pixel values, whereas the randomized bits of the dithered correction values may mitigate the visible effects of quantization error in the corrected pixel values as a population after performing the subtraction operation.

If desired, the imaging system may further include a central processing unit, memory, input-output circuitry, and a lens that focuses light onto the array of image sensor pixels.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of generating noise-corrected pixel values using an array of image sensor pixels and readout circuitry, wherein the array of image sensor pixels comprises a first group of pixels and a second group of pixels that is different from the first group of pixels, the method comprising:
   with the readout circuitry, obtaining a first set of pixel values from the first group of pixels;
   with the readout circuitry, obtaining a second set of pixel values from the second group of pixels;
   with the readout circuitry, generating a dithered correction value based on the second set of pixel values, wherein each pixel value in the second set of pixel values has a first bit width, and wherein generating the dithered correction value based on the second set of pixel values comprises performing precision extension operations on the second set of pixel values to generate an extended precision pixel value having a second bit width that is greater than the first bit width; and
   with the readout circuitry, subtracting the dithered correction value from the first set of pixel values to generate a noise-corrected pixel value.

2. The method defined in claim 1, wherein generating the dithered correction value further comprises:
   multiplying the extended precision pixel value by a scaling factor to generate a scaled extended precision pixel value.

3. The method defined in claim 2, wherein generating the dithered correction value further comprises:
   randomizing at least one bit of the scaled extended precision pixel value to generate the dithered correction value.

4. The method defined in claim 3, wherein randomizing the at least one bit of the scaled extended precision pixel value comprises:

generating a pseudo random number; and
adding at least one least significant bit of the pseudo random number to the scaled extended precision pixel value to generate the dithered correction value.

5. The method defined in claim 1, wherein performing the precision extension operations on the second set of pixel values comprises:
summing at least two of the pixel values in the second set to generate the extended precision pixel value.

6. The method defined in claim 1, further comprising:
performing precision reduction operations on the noise-corrected pixel values so that the noise-corrected pixel values have the first bit width.

7. The method defined in claim 1, further comprising:
with the first group of pixels, capturing a first set of analog image signals in response to image light from a scene; and
with the second group of pixels, capturing a second set of analog image signals without generating charge in response to the image light.

8. The method defined in claim 7, further comprising:
with the readout circuitry, performing analog-to-digital conversion operations on the first set of analog image signals to generate the first set of pixel values; and
with the readout circuitry, performing analog-to-digital conversion operations on the second set of analog image signals to generate the second set of pixel values.

9. A method of generating noise-corrected pixel values using an array of image sensor pixels and readout circuitry, wherein the array of image sensor pixels comprises a first group of pixels and a second group of pixels that is different from the first group of pixels, the method comprising:
with the readout circuitry, obtaining a first set of pixel values from the first group of pixels;
with the readout circuitry, obtaining a second set of pixel values from the second group of pixels;
with the readout circuitry, generating a dithered correction value based on the second set of pixel values;
with the readout circuitry, generating an additional dithered correction value based on the second set of pixel values, wherein the dithered correction value has a first randomized sequence of least significant bits and the additional dithered correction value has a second randomized sequence of least significant bits; and
with the readout circuitry, subtracting the dithered correction value from the first set of pixel values to generate a noise-corrected pixel value.

10. The method defined in claim 9, further comprising:
with the readout circuitry, subtracting the dithered correction value from a first pixel value in the first set of pixel values to generate the noise-corrected pixel value; and
with the readout circuitry, subtracting the additional dithered correction value from a second pixel value in the first set of pixel values to generate an additional noise-corrected pixel value.

11. A method of mitigating signal noise in an imaging system having pixel value correction circuitry, a plurality of image pixels, and at least one reference pixel, the method comprising:
with the pixel value correction circuitry, obtaining a first pixel value from the plurality of image pixels and a second pixel value from the at least one reference pixel;
with the pixel value correction circuitry, generating a random sequence of binary bits;
with the pixel value correction circuitry, adding at least one bit of the random sequence of binary bits to the second pixel value to generate a pixel correction value, wherein adding the at least one bit of the random sequence of binary bits to the second pixel value to generate the pixel correction value comprises adding at least one least significant bit of the random sequence of binary bits to the second pixel value to generate the pixel correction value; and
with the pixel value correction circuitry, subtracting the pixel correction value from the first pixel value.

12. The method defined in claim 11, wherein obtaining the second pixel value comprises:
receiving a plurality of digital dark pixel values from the at least one reference pixel, wherein each digital dark pixel value of the plurality of digital dark pixel values has a first bit width; and
summing the plurality of digital dark pixel values to generate an extended precision dark pixel value having a second bit width that is greater than the first bit width.

13. The method defined in claim 12, wherein obtaining the second pixel value further comprises:
multiplying the extended precision dark pixel value by a scaling factor to generate the second pixel value.

14. The method defined in claim 11, further comprising:
with the pixel value correction circuitry, obtaining a third pixel value from the plurality of image pixels;
with the pixel value correction circuitry, generating an additional random sequence of binary bits that is different from the random sequence of binary bits;
with the pixel value correction circuitry, adding at least one bit of the additional random sequence of binary bits to the second pixel value to generate an additional pixel correction value; and
with the pixel value correction circuitry, subtracting the additional pixel correction value from the third pixel value.

* * * * *